US008347043B2

(12) United States Patent
Murase

(10) Patent No.: US 8,347,043 B2
(45) Date of Patent: Jan. 1, 2013

(54) STORAGE MANAGEMENT TASK DISTRIBUTION METHOD AND SYSTEM ON STORAGE VIRTUALIZER

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 716 days.

(21) Appl. No.: 12/411,290

(22) Filed: Mar. 25, 2009

(65) Prior Publication Data

US 2010/0250845 A1 Sep. 30, 2010

(51) Int. Cl.
*G06F 12/00* (2006.01)
*G06F 13/00* (2006.01)
*G06F 13/28* (2006.01)
*G06F 15/16* (2006.01)

(52) U.S. Cl. ......... 711/148; 711/111; 711/154; 709/217

(58) Field of Classification Search .................. 711/111, 711/148, 154; 709/217
See application file for complete search history.

(56) References Cited

U.S. PATENT DOCUMENTS

| 2005/0193167 | A1* | 9/2005 | Eguchi et al. | 711/114 |
|---|---|---|---|---|
| 2005/0198401 | A1* | 9/2005 | Chron et al. | 709/250 |
| 2005/0289308 | A1* | 12/2005 | Kano | 711/161 |
| 2007/0143559 | A1* | 6/2007 | Yagawa | 711/170 |
| 2008/0028143 | A1* | 1/2008 | Murase | 711/114 |
| 2008/0104321 | A1* | 5/2008 | Kamisetty et al. | 711/114 |

OTHER PUBLICATIONS

Hitachi Data Systems, Products: Universal Volume Manager, http://www.hds.com/products/storage-software/universal-volume-manager.html, retrieved on Mar. 18, 2009.
EMC Invista, http://www.emc.com/products/detail/software/invista.htm, retrieved on Mar. 18, 2009.
IBM System Storage SAN Volume Controller: Overview, http://www-03.ibm.com/systems/storage/software/virtualization/svc/, retrieved on Mar. 18, 2009.
DMTF: Common Information Model (CIM), http://www.dmtf.org/standards/cim/, retrieved on Mar. 18, 2009.
DMTF: Web-Based Enterprise Management (WBEM), http://www.dmtf.org/standards/wbem/, retrieved on Mar. 25, 2009.
DMTF: CIM-XML, http://www.dmtf.org/standards/wbem/CIM-XML, retrieved on Mar. 25, 2009.
DMTF: Management Profiles, http://www.dmtf.org/standards/profiles/, retrieved on Mar. 25, 2009.
SNIA Storage Management Initiative Specification (SMI-S), http://www.snia.org/tech_activities/standards/curr_standards/smi/, retrieved on Mar. 25, 2009.

* cited by examiner

*Primary Examiner* — Jared Rutz
*Assistant Examiner* — Ryan Bertram
(74) *Attorney, Agent, or Firm* — Sughrue Mion, PLLC

(57) ABSTRACT

Systems and methods for dissolving the bottleneck issue of management task requested from management client to the storage virtualizer which consolidates externally attached storage arrays while providing a single management point of the entire system to the management client. Specifically, by utilizing the storage virtualizer to distribute received management tasks to respective external attached arrays, it can off load tasks, thus reducing the workload on the storage virtualizer itself. Because of the task distribution, the storage virtualizer consequently does not need to copy and hold detailed information of each storage volume in the respective attached storage arrays, thereby avoiding any inconsistent information between the arrays and the virtualizer when the configuration change has been done on the external array.

18 Claims, 19 Drawing Sheets

Logical Element Structure

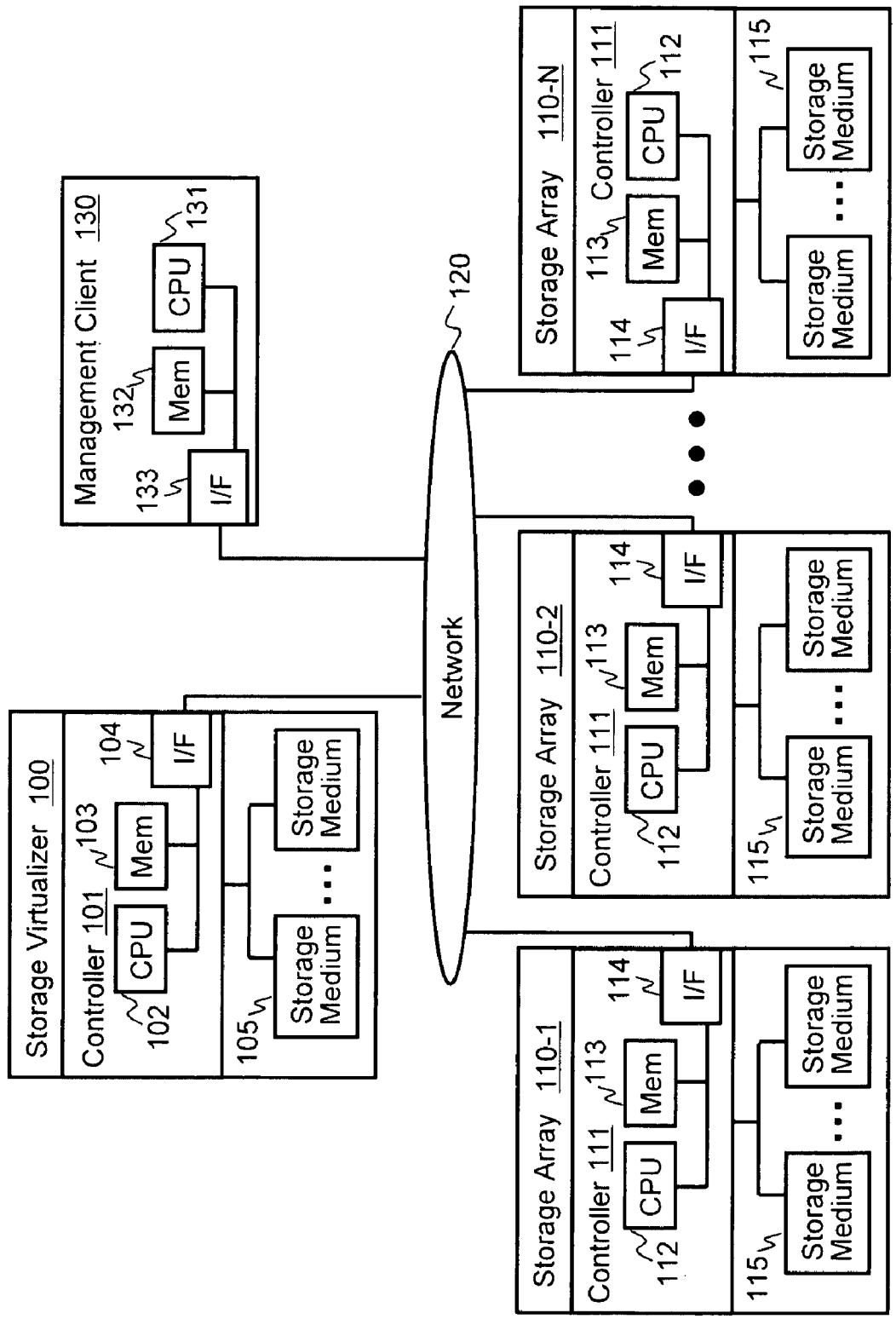
FIG. 1 Hardware Architecture

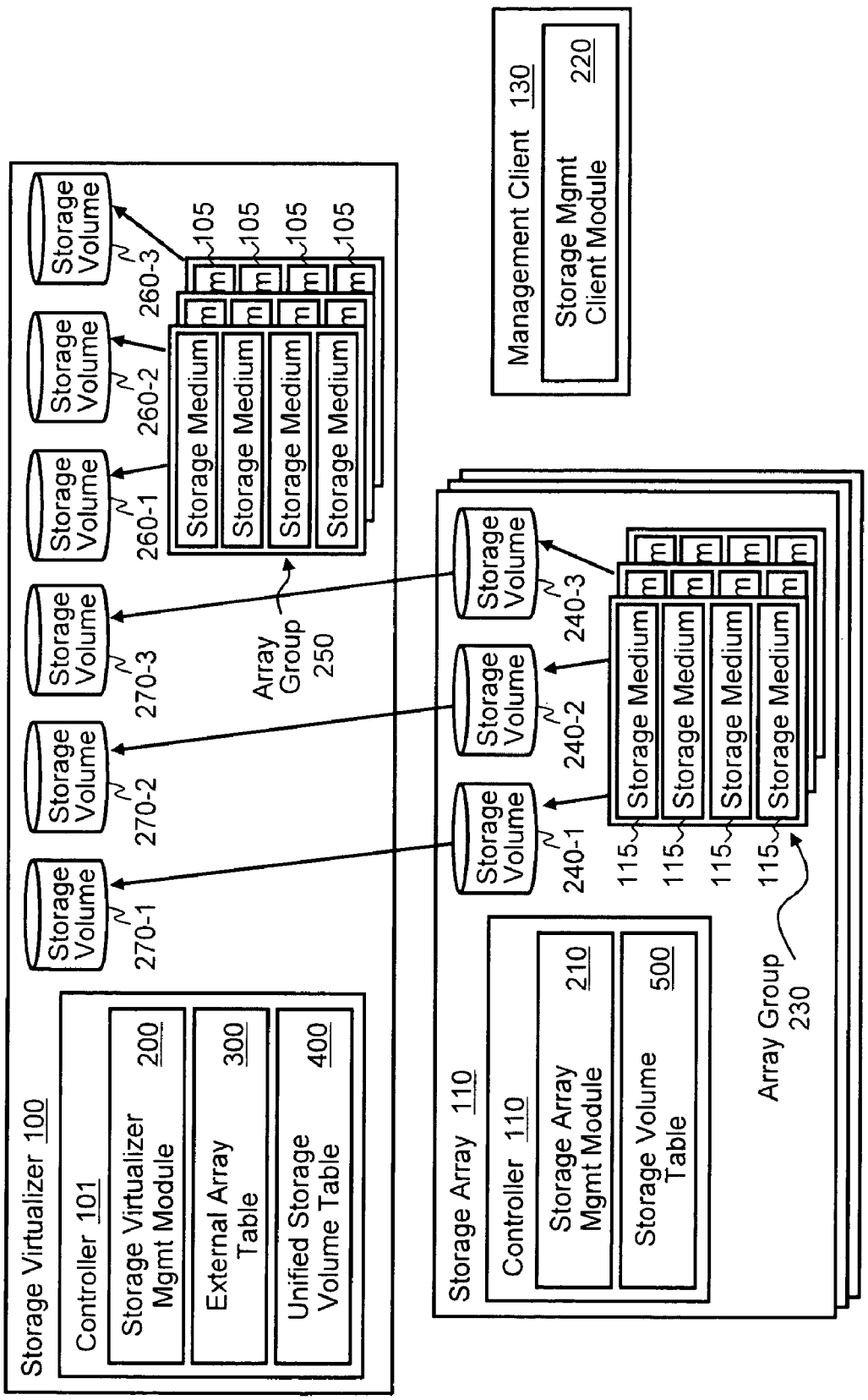
FIG. 2 Logical Element Structure

| Storage System ID / 310 | IP Address / 320 | Namespace / 330 |
|---|---|---|
| EAry10 | 10.1.134.1 | /root/ns0 |
| EAry20 | 10.1.134.2 | /root/ns1 |
| EAry30 | 10.1.134.3 | /root/ns2 |
| ... | ... | ... |

FIG. 3 Data Structure of External Array Table

| Storage Volume ID | Volume Type | Storage System ID | Size | RAID Type | ... |
|---|---|---|---|---|---|
| Vol01 | Internal | VAry00 | 1TB | RAID5 | ... |
| Vol02 | Internal | VAry00 | 500GB | RAID5 | ... |
| Vol03 | External | EAry10 | null | null | ... |
| Vol04 | External | EAry10 | null | null | ... |
| Vol05 | External | EAry20 | null | null | ... |
| ... | ... | ... | ... | ... | ... |

FIG. 4 Data Structure of Unified Storage Volume Table

| Storage Volume ID ~510 | Size ~520 | RAID Type ~530 | ... |
|---|---|---|---|
| Vol03 | 1TB | RAID1 | ... |
| Vol04 | 2TB | RAID5 | ... |
| ... | ... | ... | |

FIG. 5 Data Structure of Storage Volume Table

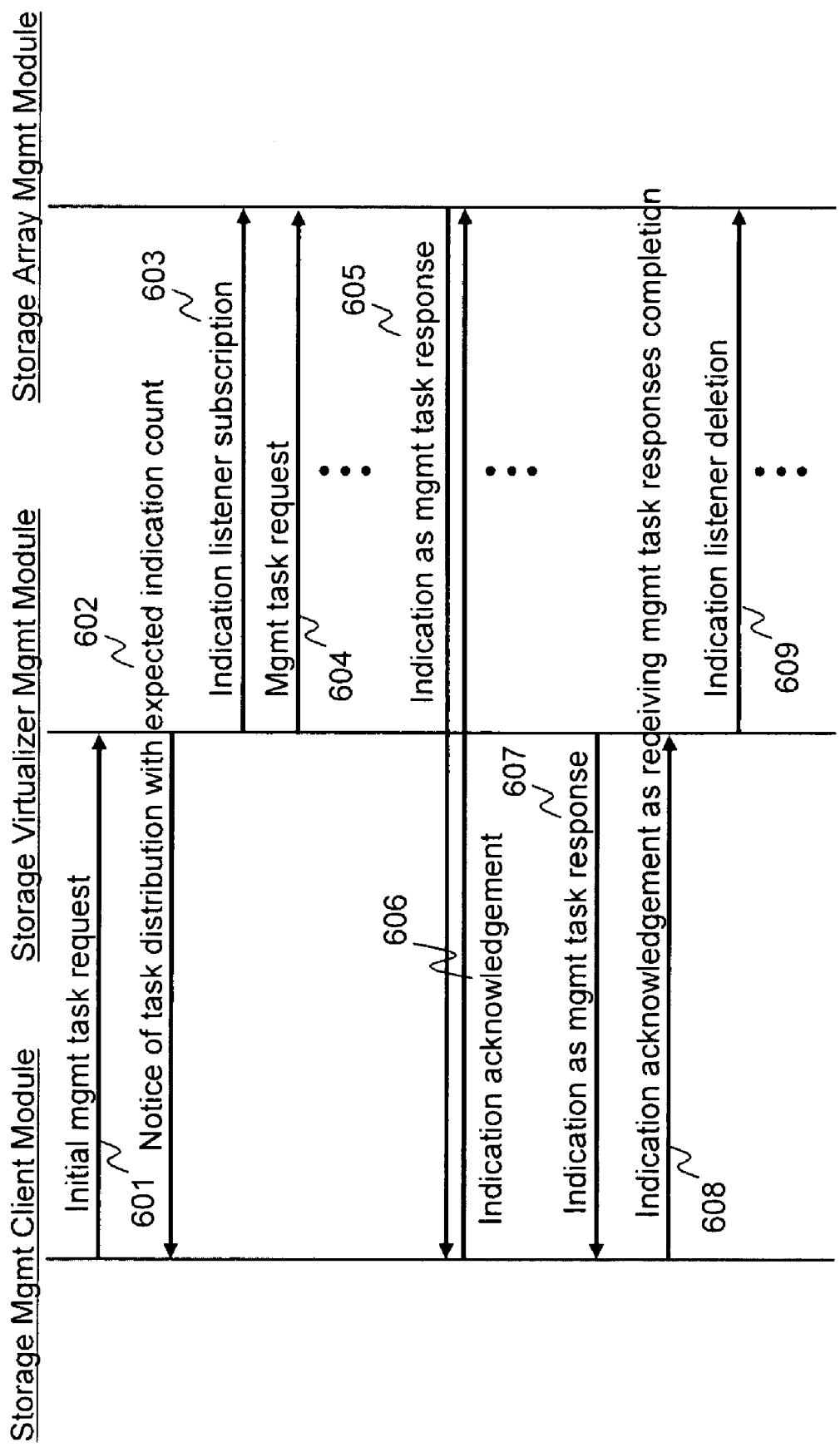
FIG. 6 Entire Process Sequence of Management Task Distribution

```
<?xml version="1.0" encoding="UTF-8" ?>
...
<RSP> ~700
    <METHODRSP NAME="EnumerateInstances"> ~701
        <RETURNVALUE> ~703

<INSTANCE CLASSNAME="StorageVolume">                ⎫
                <KEYBINDING NAME="ID"> ~704                      |
                    <KEYVALUE>Vol03</KEYVALUE></KEYBINDING>      |
                <PROPERTY NAME="Size"> ~705                      |
                    <VALUE>2147483648</VALUE></PROPERTY>         ⎬ ~702-1
                <PROPERTY NAME="RAIDType"> ~706                  |
                    <VALUE>RAID1</VALUE></PROPERTY>              |
            </INSTANCE>                                          ⎭
            ...
            <INSTANCE CLASSNAME="StorageVolume">                ⎫
                <KEYBINDING NAME="ID">                           |
                    <KEYVALUE>Vol04</KEYVALUE></KEYBINDING>      |
                <PROPERTY NAME="Size">                           |
                    <VALUE>4294967296</VALUE></PROPERTY>         ⎬ ~702-2
                <PERPERTY NAME="RAIDType">                       |
                    <VALUE>RAID5</VALUE></PROPERTY>              |
            </INSTANCE>                                          ⎭
            ...

</RETURNVALUE>
    </METHODRSP>
</RSP>
```

FIG. 7 Response Message of "EnumerateInstance" Request

```
<?xml version="1.0" encoding="UTF-8" ?>
...
<REQ> ~800
  <METHODCALL NAME="EnumerateInstance">    801
    <NAMESPACE NAME="root/ns0" />  ~802
    <PARAM NAME="ClassName"> ~803
      <VALUE>StorageVolume</VALUE></PARAM>
    <PARAM NAME="IndicationOption"> ~804
      <VALUE>TRUE</VALUE></PARAM>
  </METHODCALL>
</REQ>
```

FIG. 8 EnumerateInstance Request Message with IndicationOption

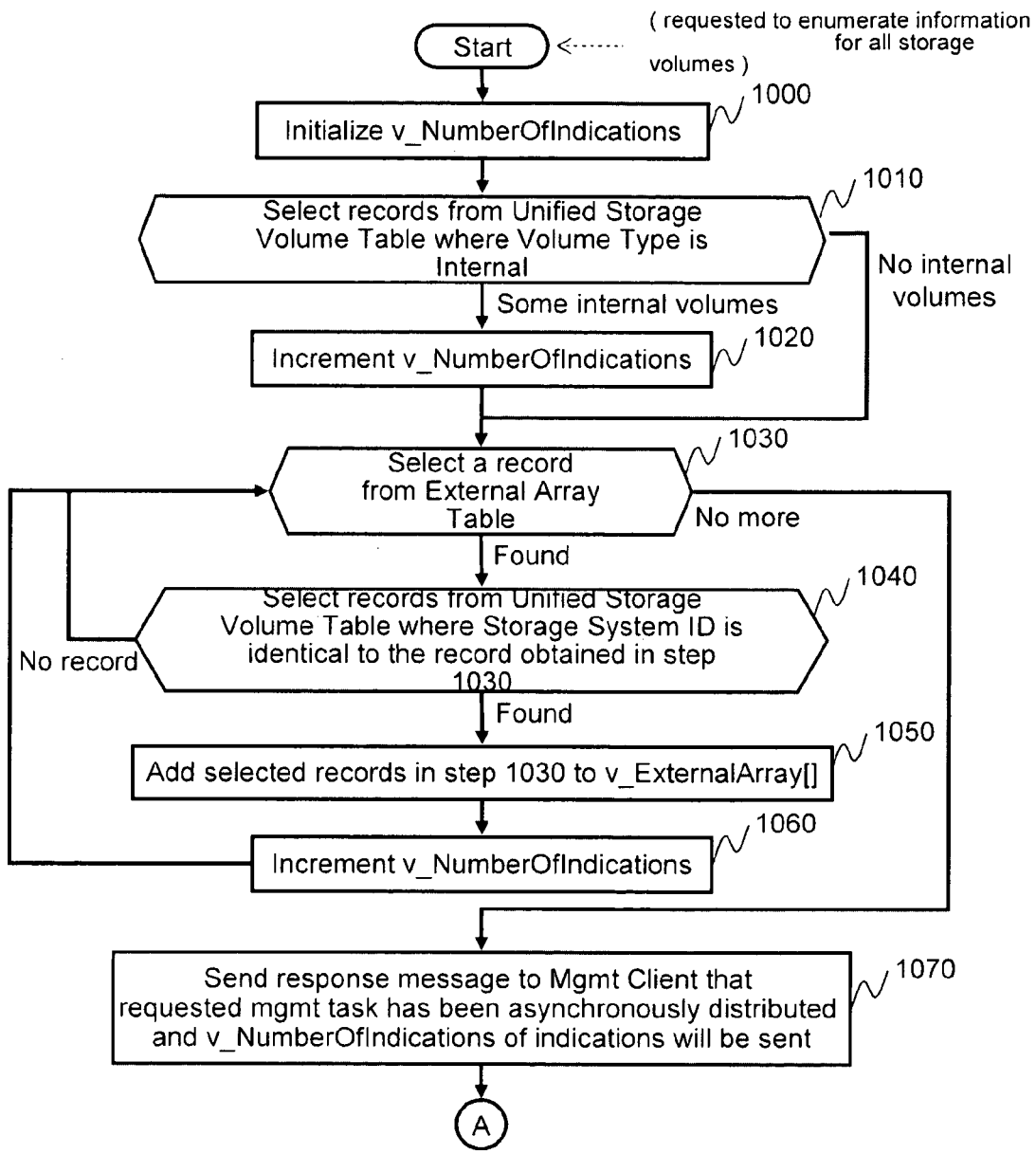
FIG. 9 Process of Management Task Distribution on Storage Virtualizer (a)

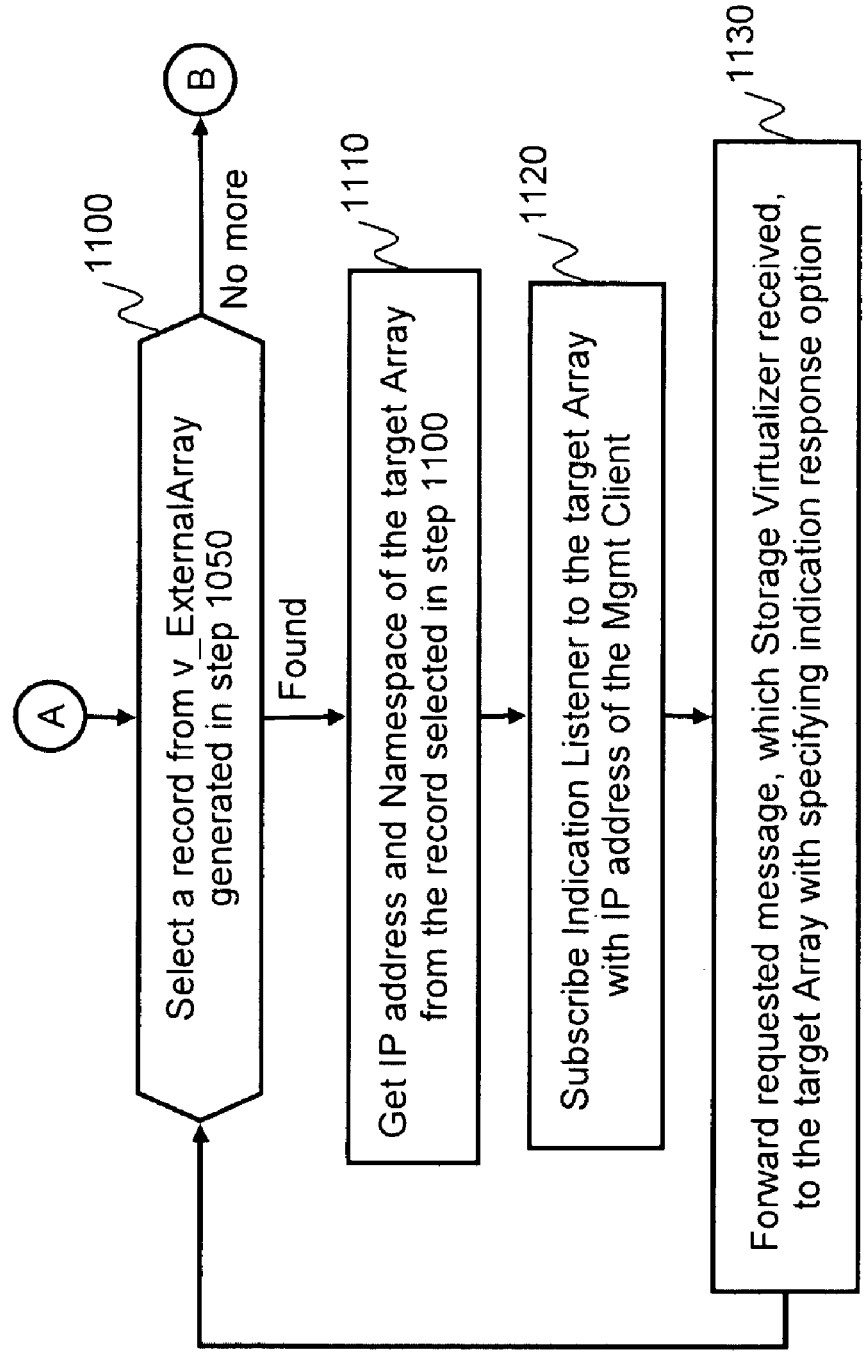
FIG. 10 Process of Management Task Distribution on Storage Virtualizer (b)

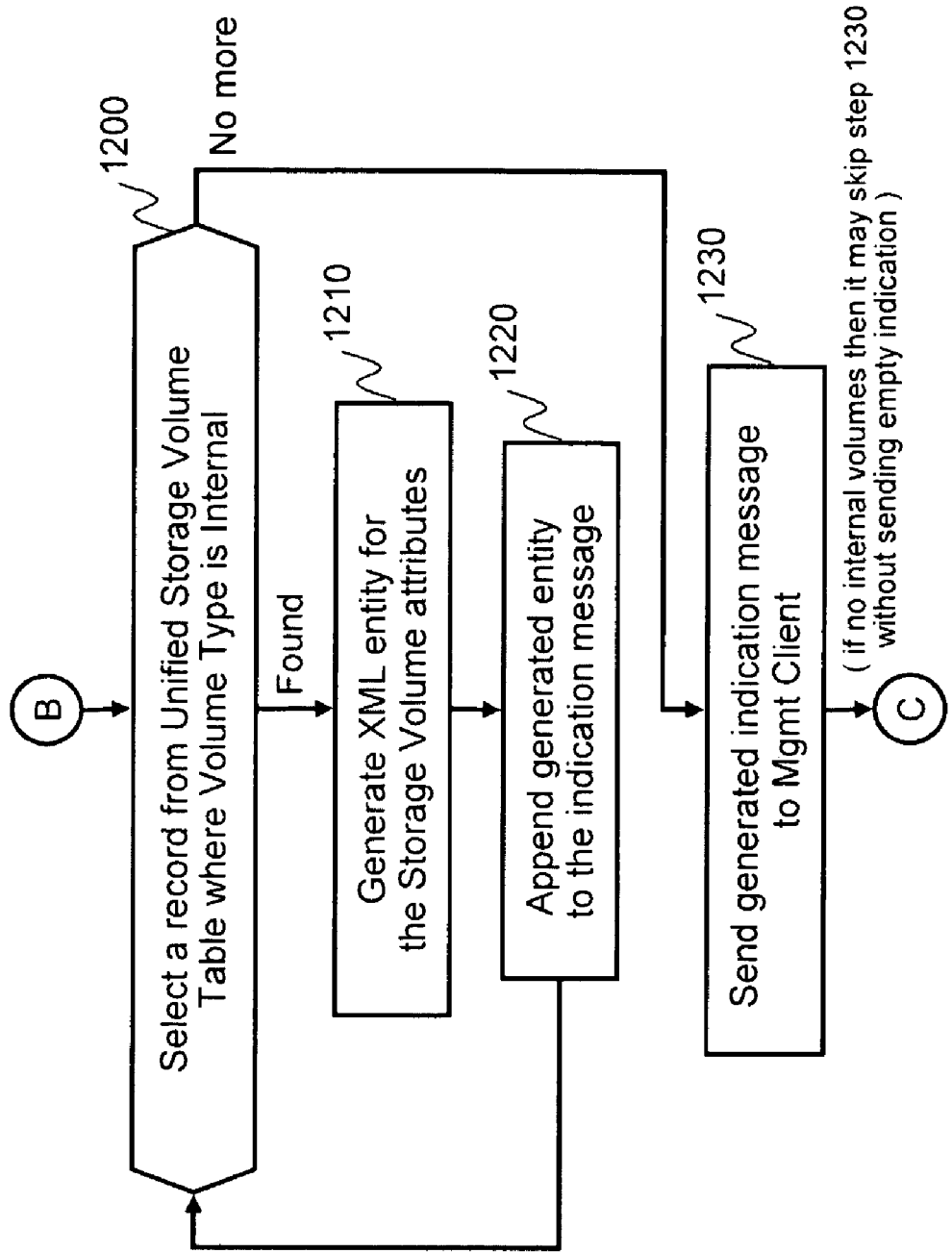
FIG. 11 Process of Management Task Distribution on Storage Virtualizer (c)

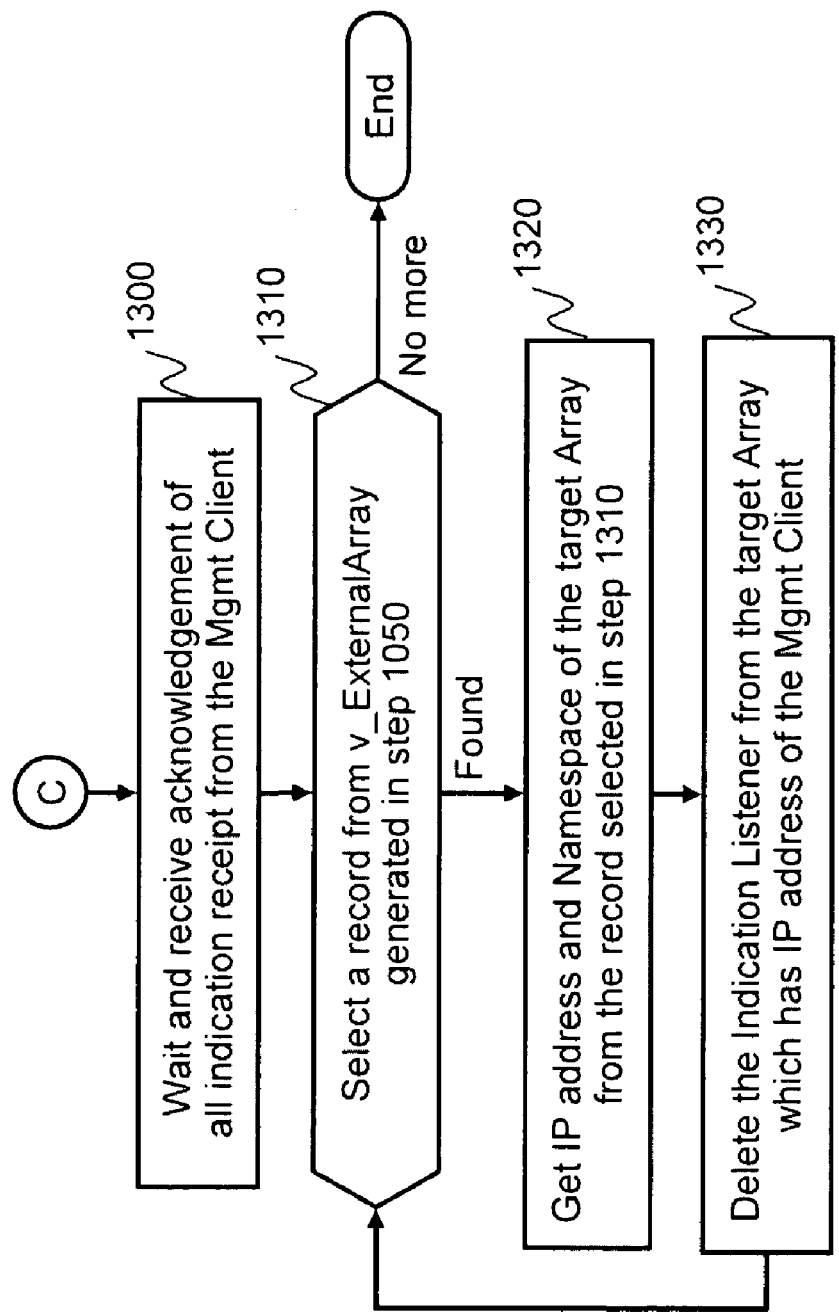
FIG. 12 Process of Management Task Distribution on Storage Virtualizer (d)

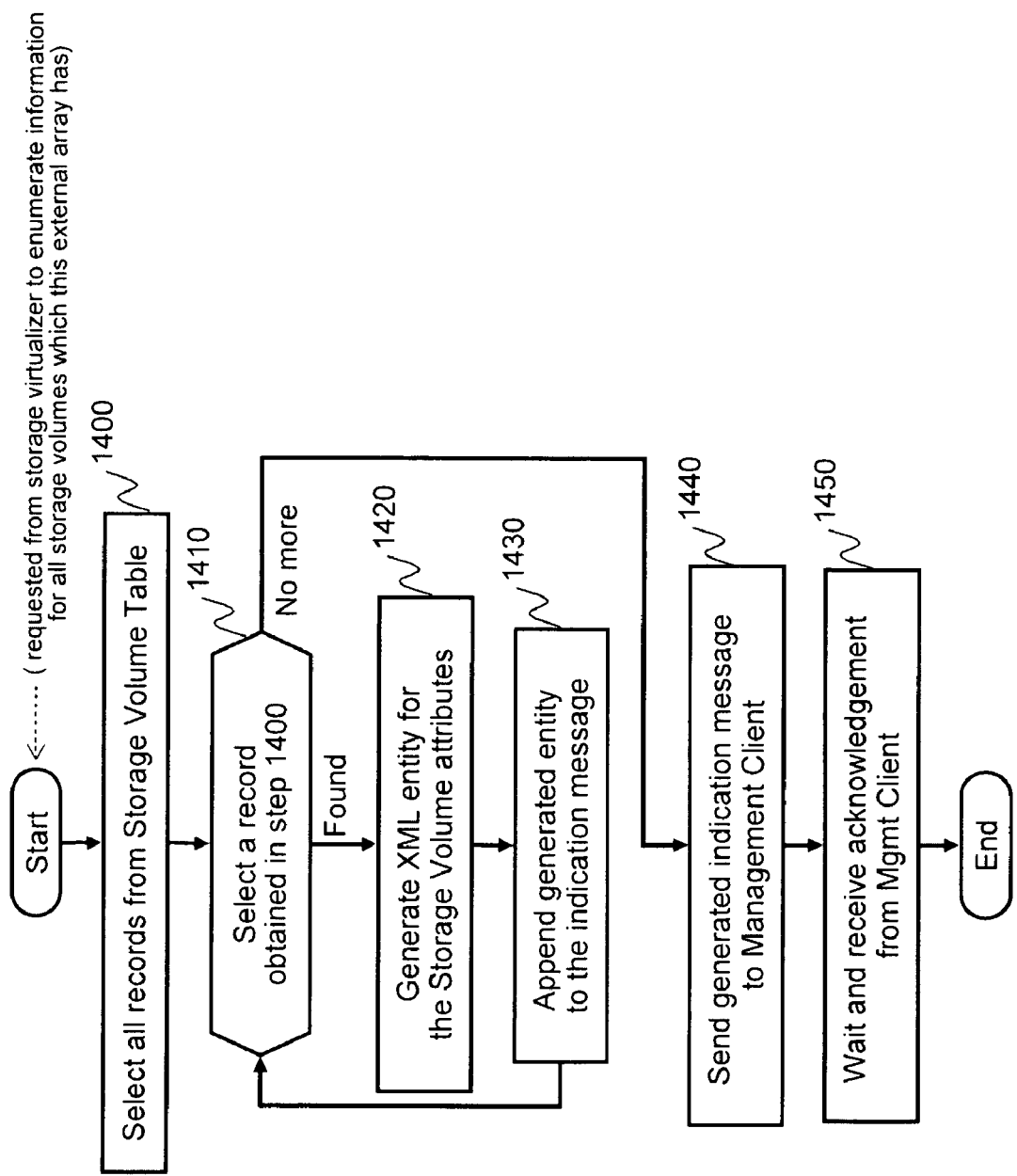
FIG. 13 Process of Management Task on External Array

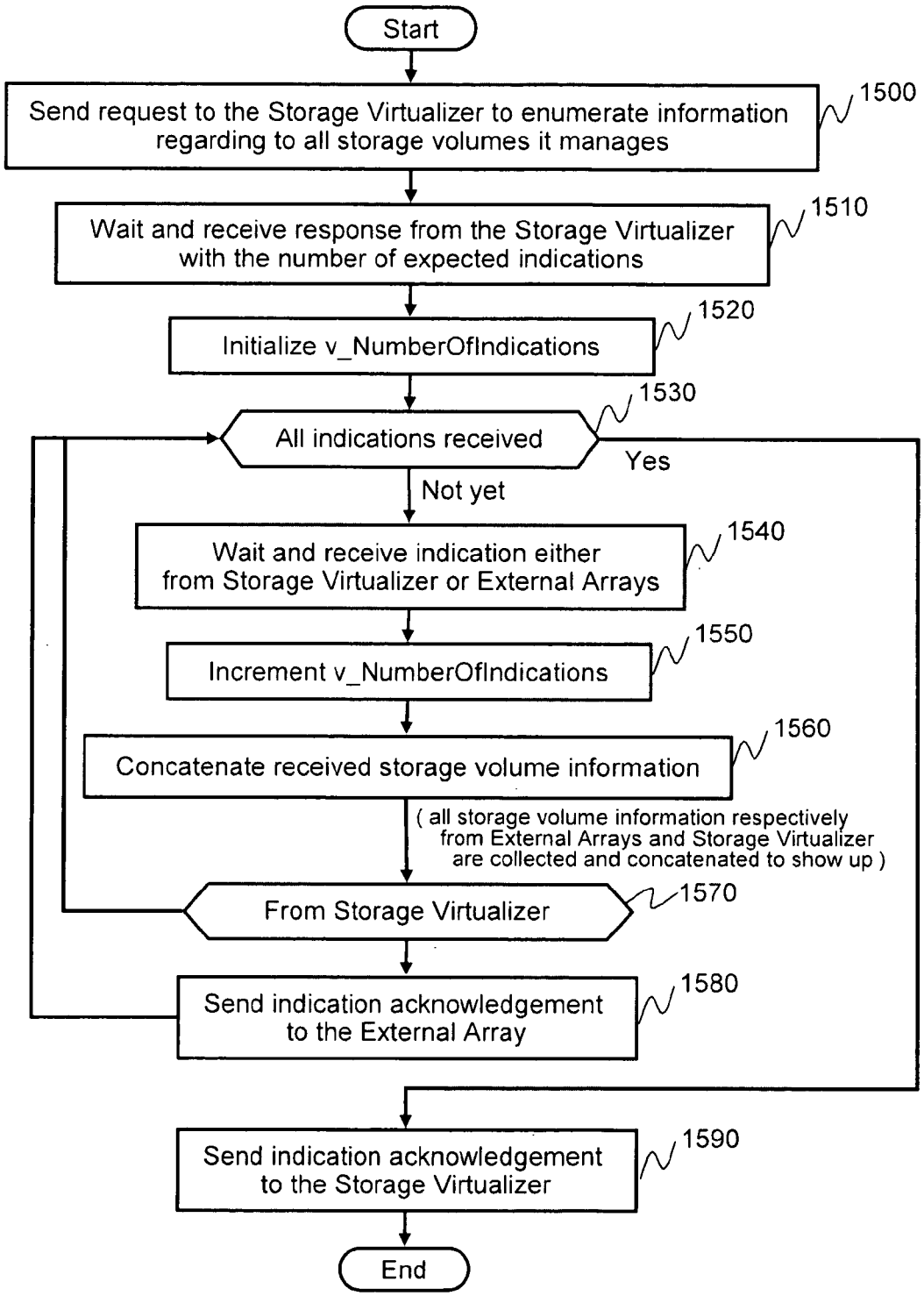
FIG. 14 Process of Management Task Request on Management Client

| Storage Volume ID 2010 | Volume Type 2020 | Storage System ID 2030 | Size 2040 | RAID Type 2050 | ... |
|---|---|---|---|---|---|
| Vol01 | Internal | VAry00 | 1TB | RAID5 | ... |
| Vol02 | Internal | VAry00 | 500GB | RAID5 | ... |
| Vol03 | External | EAry10 | 1TB | RAID1 | ... |
| Vol04 | External | EAry10 | 2TB | RAID5 | ... |
| Vol05 | External | EAry20 | 1TB | RAID5 | ... |
| ... | ... | ... | ... | ... | ... |

FIG. 15  Data Structure of Unified Storage Volume Table

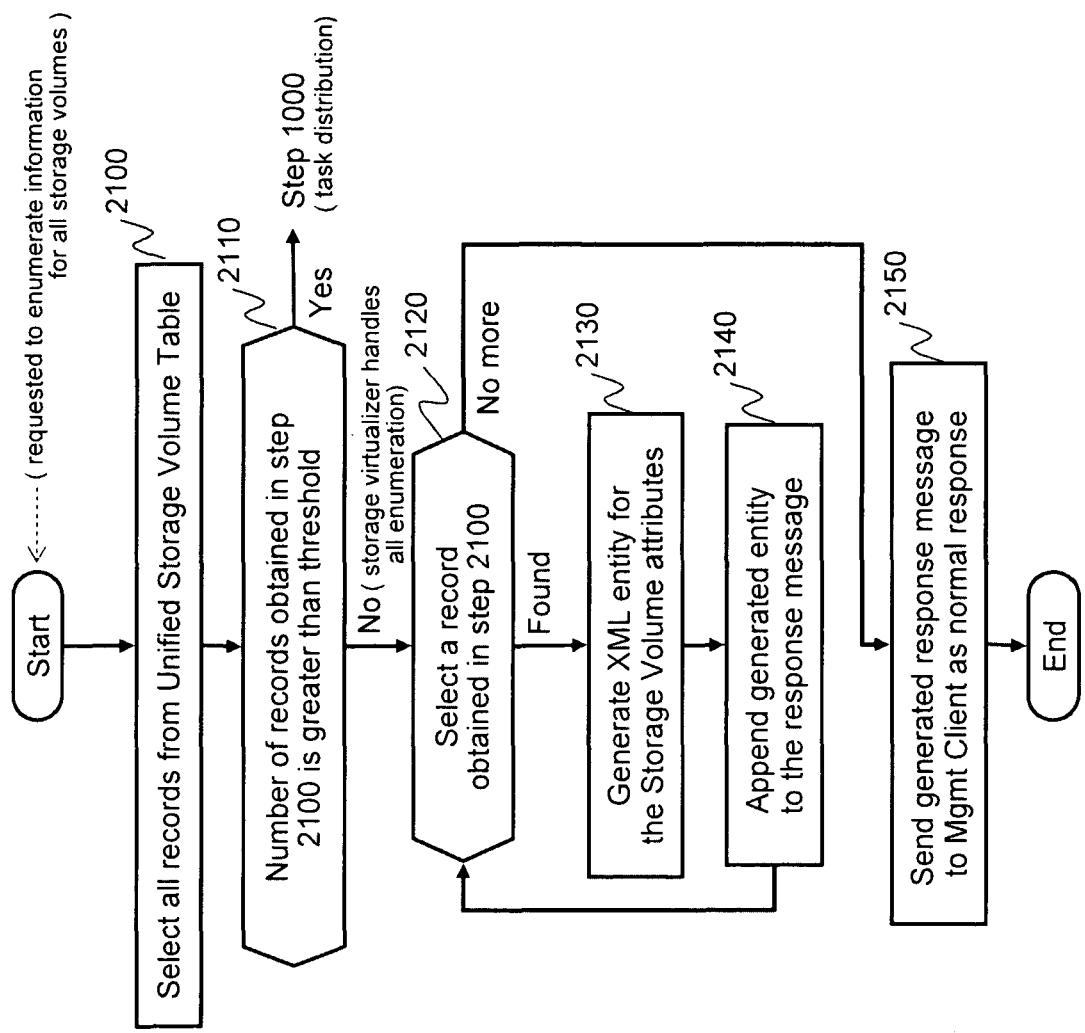
FIG. 16 Process of Management Task Distribution on Storage Virtualizer

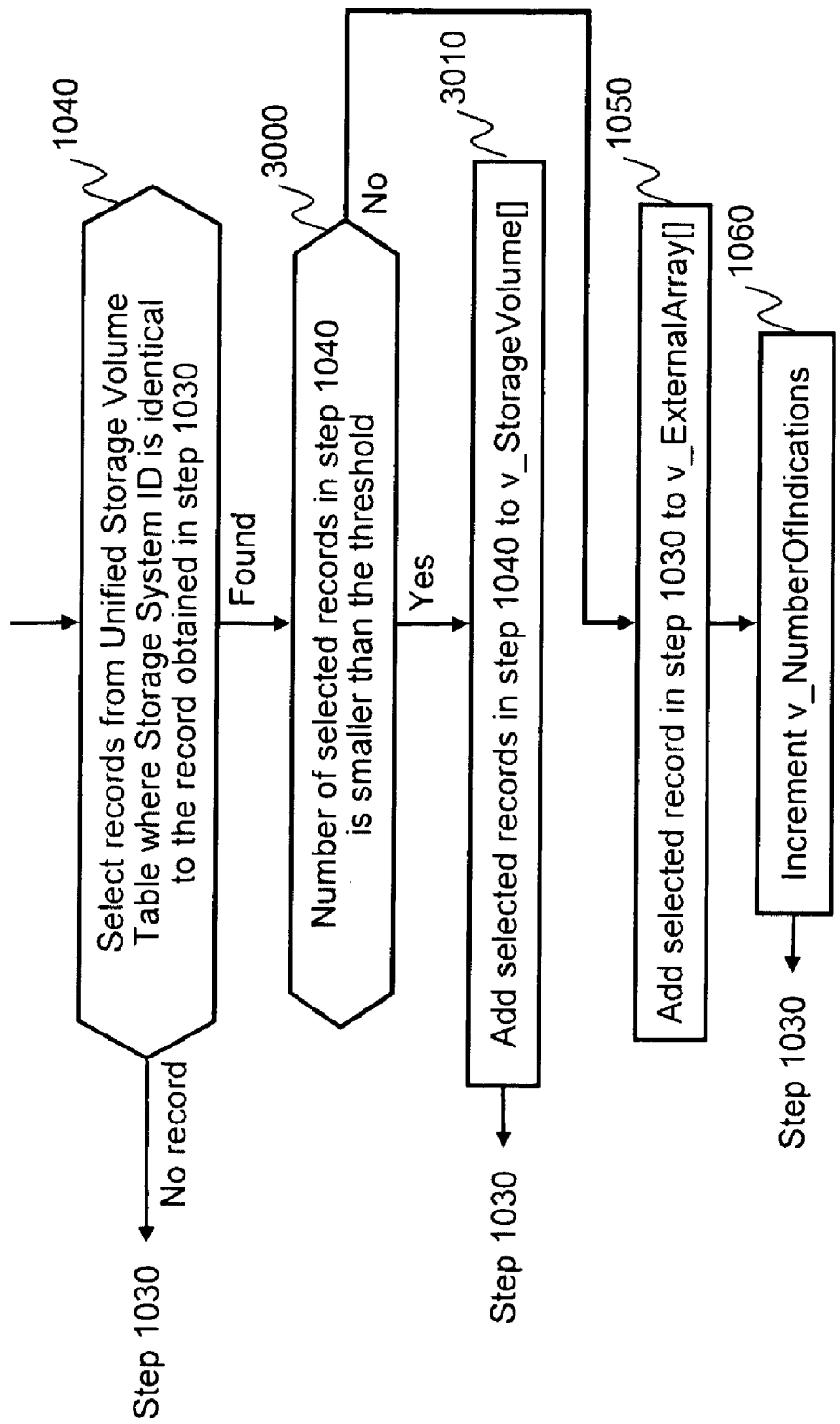
FIG. 17 Process of Management Task Distribution on Storage Virtualizer (x)

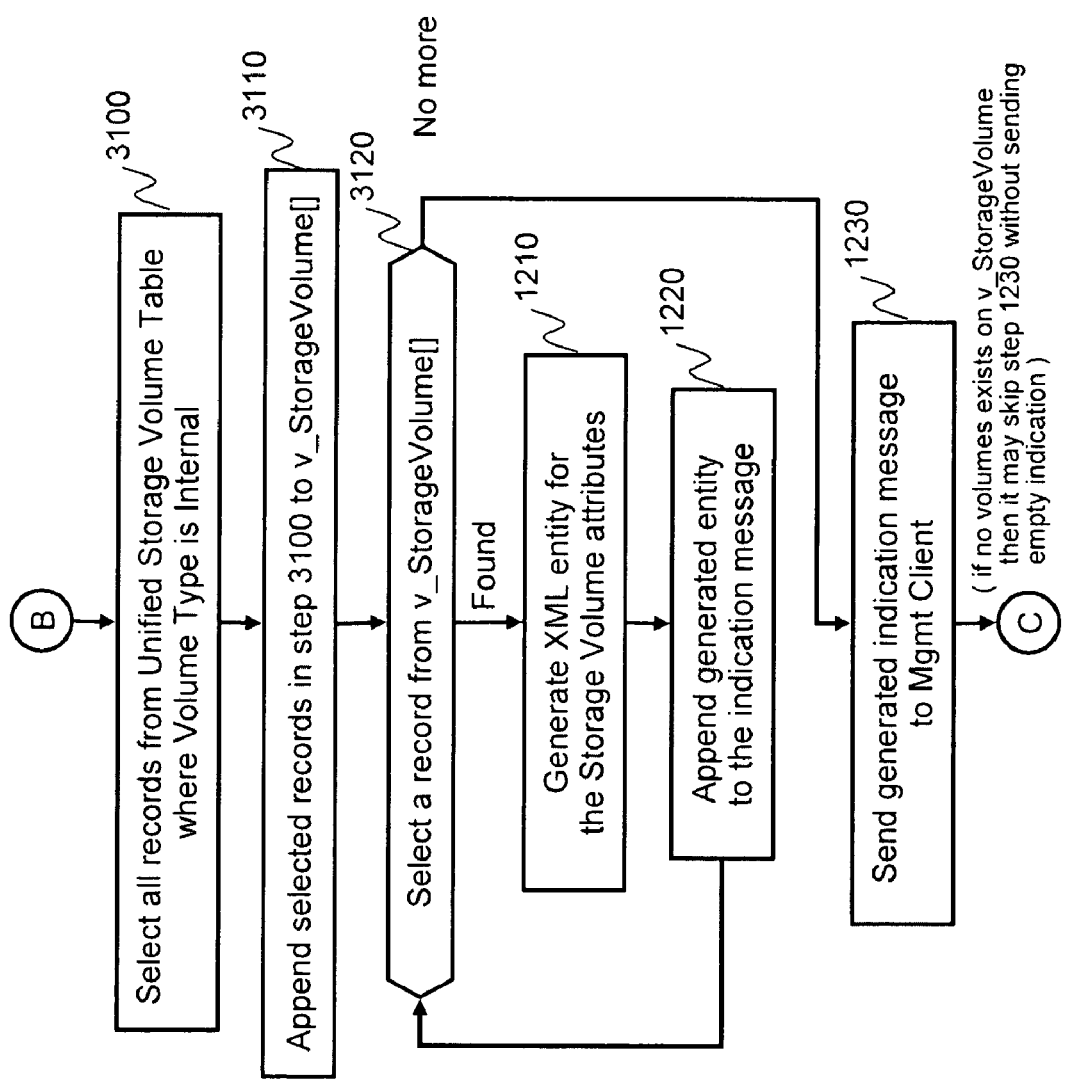
FIG. 18 Process of Management Task Distribution on Storage Virtualizer (y)

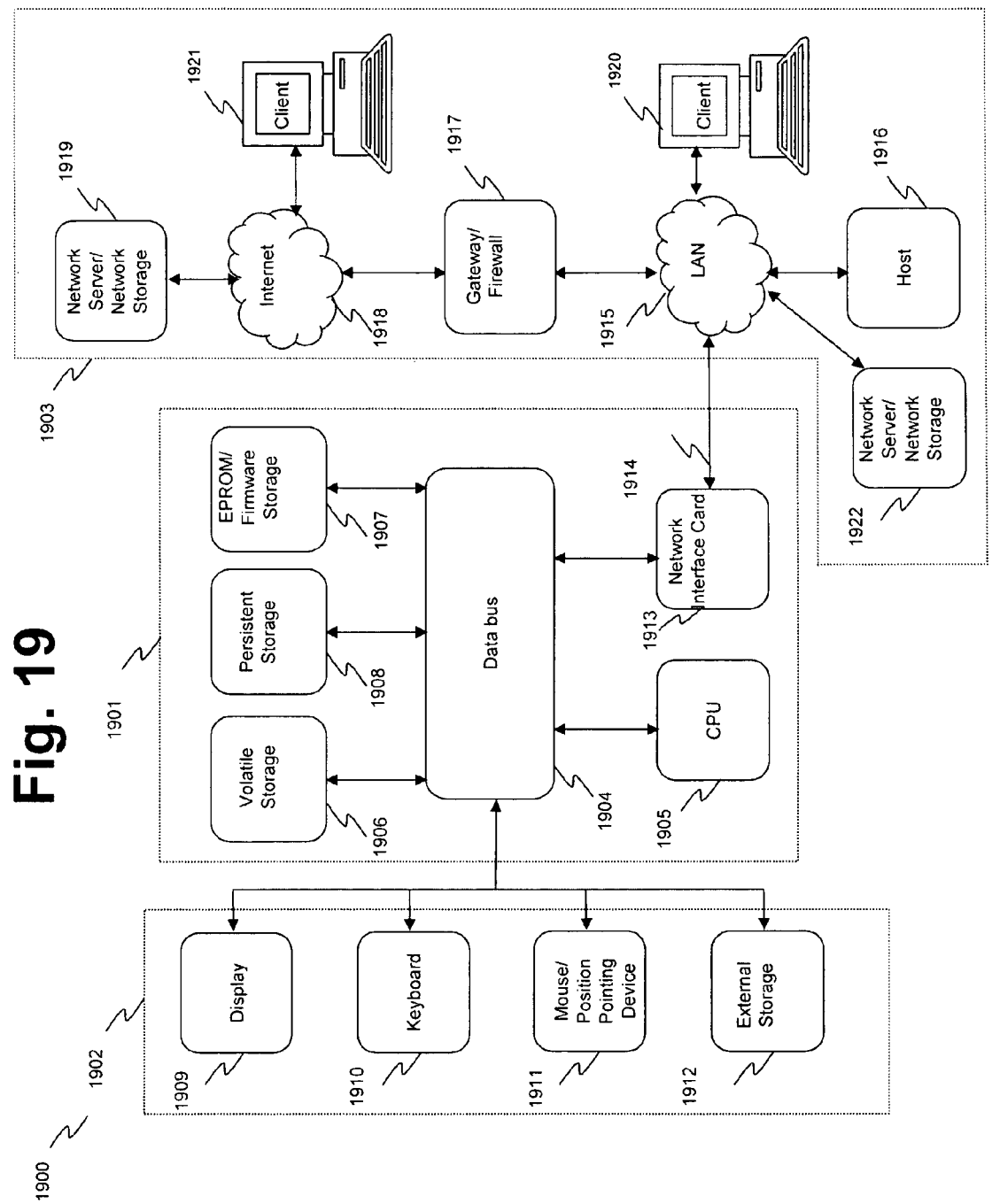

STORAGE MANAGEMENT TASK DISTRIBUTION METHOD AND SYSTEM ON STORAGE VIRTUALIZER

DESCRIPTION OF THE INVENTION

1. Field of the Invention

This invention generally relates to storage systems and more specifically to handling management tasks efficiently without creating a bottleneck within the storage environment.

2. Description of the Related Art

The amount of business information of various types has been growing at a very high rate year over year and will likely continue to do so. On the other hand, the IT budget is a limiting constraint, compelling administrators or IT architects to continue reusing existing assets (storage devices) in parts of their system even while new devices have been deployed. As a result, the number, types and generations of storage devices within the system continue to grow, and the administrator has to deal with this complex situation.

Storage virtualization technology is a solution for simplifying such diverse storage systems. Such technology logically represents a plurality of storage devices as if they were consolidated into a single storage device with a large capacity. This offers a single storage management point to the administrator, thereby reducing or simplifying the management operation labor. For instance, when a storage management client software initiates a management command for "enumerating information regarding all of system's the existing storage volumes" to the centralized storage virtualizer device, then the storage virtualizer device will respond not only with the volume information within the virtualizer device, but also whole volume information based on all the volume information gathered from all of the externally attached storage arrays. The management client software or the administrators only need to communicate with the storage virtualizer instead of the respective storage arrays to manage the entire system.

However, because of the massive growth in data as indicated earlier, and also because of the rapid emergence and deployment of server virtualization into the system, the number of storage volumes in a company is becoming extremely large. Storage virtualization technology consolidates the management point for purposes of simplification; however, at the same time, it gathers all of the storage management tasks and thus the management workload or numbers of storage volumes that the storage virtualizer has to handle from a request from a management client has exponentially increased. This has caused a new problem of management task performance deterioration on the storage virtualizer due to memory or processing power inadequacies to handle such a huge number of objects.

Therefore, there is a demand for a solution to handle management tasks efficiently without causing a bottleneck within the storage environment while utilizing storage virtualization/consolidation technology.

SUMMARY OF THE INVENTION

The inventive methodology is directed to methods and systems that substantially obviate one or more of the above and other problems associated with the bottleneck problems within the storage environment.

Aspects of the present include a plurality of storage arrays, each storage array comprising a controller; a storage virtualizer to which the plurality of storage arrays are externally attached so that a plurality of storage volumes in the plurality of storage arrays are virtually represented to a host as if the plurality of volumes exist on the storage virtualizer, the storage virtualizer comprising a storage virtualizer management module; a management client sending a management command to the storage virtualizer; wherein the storage virtualizer management module comprises instructions for receiving a management command from the management client; selecting a storage array from the plurality of storage arrays; and delegating the received command to the selected storage array for processing.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 illustrates an exemplary hardware architecture of the first embodiment of the invention.

FIG. 2 shows an embodiment of the software and logical element structure.

FIG. 3 shows an example data structure of the external array table.

FIG. 4 shows an example data structure of a unified storage volume table.

FIG. 5 illustrates an example data structure of the storage volume table.

FIG. 6 shows an example process sequence of the management task distribution between the Storage Management Client Module, the Storage Virtualizer Management Module and the Storage Array Management Module.

FIG. 7 illustrates an example of a message format sent back to Management Client from Storage Arrays or Storage Virtualizer.

FIG. 8 shows an example of the message format sent to the storage arrays from the storage virtualizer.

FIGS. 9 through 12 shows an example process for a management task distribution executed on the storage virtualizer after it has requested the task from the management client.

FIG. 13 shows an example process for the management task execution on each storage array after delegation from the storage virtualizer.

FIG. 14 shows an example process for issuing management task request to the Storage Virtualizer from the Management Client and receiving every result from Storage Arrays.

FIG. 15 shows an example data structure of the Unified Storage Volume Table for the second embodiment.

FIG. 16 shows an example process for the management task distribution executed on the storage virtualizer after it has requested the task from the management client for the second embodiment.

FIG. 17 shows an example process for the management task distribution executed on the storage virtualizer in the third embodiment.

FIG. 18 shows another portion of the example process for the management task distribution executed on the storage virtualizer for the third embodiment.

FIG. 19 illustrates an exemplary embodiment of a computer platform upon which the inventive system may be implemented.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The storage management task distribution method on the storage virtualizer disclosed in this invention is described herein.

The storage area network is composed of a plurality of storage arrays which provide storage volumes to store data. Those storage arrays are externally attached to a single storage virtualizer placed in the center of the entire system. The storage virtualizer represents the virtual volumes corresponding to the respective storage volumes on attached storage arrays to the host as if the volume exists on the storage virtualizer, as well as indicating the internal storage volumes that the storage virtualizer has.

All of the storage management tasks for any of the storage volumes, either on the storage virtualizer itself or any externally attached storage arrays, will be sent to the storage virtualizer from the management client.

The Storage Virtualizer Management Module on the storage virtualizer, which is the primary means of the present invention, distributes the received management command from the management client to the respective storage arrays; specifying the management client address as the responding point for the performed management task in each storage array. Thus each of the task results, for example enumerating the storage volume information, will be sent to the management client from each storage array independently without passing through the storage virtualizer.

Just before the storage virtualizer forwards a command to each of the Storage Arrays, it will send a notice to the management client that the requested task has been asynchronously started and a specified number of task results (indications) will be sent to the management client.

After receiving a notice from the storage virtualizer, the management client waits and receives a specified number of indications from storage arrays independently as well as from the storage virtualizer. By concatenating those results, the management client can thereby have a full list of task results, such as the entire enumeration of storage volumes that exist in the entire system, whereby it could use the information on the client's tasks, such as showing the list of storage volumes on its GUI.

By delegating the management tasks, such as enumerating the information of storage volumes of each Storage Array to individual storage arrays for processing, rather than processing (referring the configuration information of objects and generating a corresponding full response message to the management client) them by the storage virtualizer, the workload will be distributed to each of the storage arrays (as well as the storage virtualizer) so that the full possible range of throughput can be achieved by utilizing all of the processing power in the whole storage devices within the system. Since each respective storage array originally has its own controller and processing power, this invention will utilize those computing resources to accelerate management tasks sent to the storage virtualizer by doing it concurrently, while representing the storage virtualizer as the a single management point for the management client to simplify management. That is the basic principle of this invention.

Now, exemplary embodiments of the invention will be described in detail.

First Embodiment

FIG. 1 shows an example of physical hardware architecture of this embodiment. The overall system includes a Storage Virtualizer 100, a plurality of Storage Arrays 110 and a management client 130. Those are connected by a network 120.

The storage virtualizer 100 is the front end device for hosts or the management client 130. It includes a Controller 101 and storage mediums 105. The Controller can include CPU 102, Memory 103, and a network interface 104. The storage mediums are connected to the controller and can be any of a variety of devices, such as a hard disk, flash memory, optical disk, tape, and so on. The primary functionality of the Storage Virtualizer is to present a logically consolidated storage capacity of the entire system organized with storage arrays. However, sometimes it doesn't have to have the internal capacity by itself, but merely needs to orchestrate the data I/O by utilizing the capacity of the externally attached Storage Arrays. In that case, the storage medium 105 is not needed.

The storage arrays 110 are represented as storage devices to store and retrieve data requested from hosts. These devices are externally attached to the storage virtualizer to logically form a huge storage system. It may include a Controller 111 and storage mediums 115. The controller may include a CPU 112, Memory 113, and Network Interface 114. Storage Mediums are connected to the controller and it could include devices such as hard disk, flash memory, optical disk, tape, and so on.

The management client 130 is a generic computer that includes a CPU 131, Memory 132, and Network Interface 133. It is a terminal computer for the storage administrators.

FIG. 2 shows an embodiment of the software and logical element structure.

Storage Volume Composition of Storage Arrays 110

The Array Group 230 is the logical capacity composed of a plurality of storage mediums 115 in a so called RAID group. For example it can be composed as a RAID 5 array with 3 disks of data and 1 parity disk. Storage volume 240 is the logical capacity respectively carved from the array groups. Of course, there could be various types of RAID level and size that can be utilized.

Storage Volume Composition of Storage Virtualizer 100

The array group 250 and the storage volumes 260 are the same elements as described above. They are the "internal" Storage Volumes that the storage virtualizer exposes to the hosts. At the same time, it holds "virtual" storage volumes 270 which are mapped to storage volumes 240 inside of externally attached storage arrays, and is also exposed to the hosts as well as the internal storage volumes. Hosts or users can use both types of storage volumes in the same manner.

Software on the Controller of Storage Arrays 110

The Storage Array Management Module 210 is the program for operating a set of storage element management, such as retrieving its configuration information or creating a new storage volume by a client request (in this invention, the storage virtualizer will be the client for the storage arrays). The storage array management module can provide such services through a request/response message transferring mechanism. For instance, the client side will form a XML message describing a request for performing an operation to specific objects. Then it will send the message to the storage array. By receiving the message it will perform specified management task, such as enumerating information of all of the storage volumes that the storage array holds, and generates a XML message describing the result of the requested management task. Then it sends the message back to client side where requested. The Storage Volume Table 500 holds the records ID and related attribute values of the Storage Volumes 240 which the respective storage array holds Software on the Controller of Storage Virtualizer 100

The Storage Virtualizer Management Module 200 is the key program of this invention for handling the management task distribution within the storage virtualizer and the plurality of storage arrays. It provides the set of storage element management functionality which the storage array management module offers for internal storage volumes 260 and virtual storage volumes 270, while handling the management task distribution simultaneously. It also provides such services through a request/response message transferring mechanism as described above, between the Storage Management Client Module 220.

The External Array Table 300 holds access information records of externally attached storage arrays. The Unified Storage Volume Table 400 holds record IDs and related attribute values of both the internal and virtual storage volumes.

Software on the Management Client 130

The Storage Management Client Module 220 is the program for offering a user interface to storage administrators for a set of storage management operations. It sends management task requests to the storage virtualizer management module on the storage virtualizer. It also receives the management task results independently by the indication mechanisms from the storage arrays and the storage virtualizer.

FIG. 3 shows an example data structure of External Array Table 300. It holds access information of respective storage arrays that are externally attached to the storage virtualizer. The Storage System ID 310 is an identification for a given storage array. The IP Address 320 indicates the storage array's IP address. The Namespace 330 provides a namespace to offer management task services which need to be specified when client send a request to storage array.

For instance, line 391 represents a record of a storage array which has "EAry10" as the ID and its IP address is "10.1.134.1" and namespace need to be specified during the request sending is "/root/ns0."

This table is referred to by the storage virtualizer management module 200 to find attached storage arrays and retrieve access information when distributing the management tasks that the storage virtualizer received from the management client.

FIG. 4 shows an example data structure of a Unified Storage Volume Table 400. It holds the ID and attributes values of respective internal and virtual storage volumes that the storage virtualizer manages. Thus, this table holds both types of storage volumes.

Storage Volume ID 410 is an identification for a given storage volume.

Volume Type 420: Indicates if the volume is placed internally in the storage virtualizer or in one of the externally attached storage arrays.

Storage System ID 430 is an identification for a given storage array or storage virtualizer that provides the storage volume.

Size 440 indicates the size of the storage volume. In this embodiment, only the values for internal storage volumes are stored and the value for a virtual storage volume is null.

RAID Type 450 indicates the RAID type of the storage volume. Only for the internal storage volumes are stored as well as "Size".

For instance, line 491 represents a record of a storage volume which has "Vol01" as the ID, and is an "Internal" storage volume of the storage virtualizer "Vary00", and it contains "1 TB" size of capacity with a "RAID5" configuration. Of course, these are merely examples of attributes for storage volumes that can be displayed; more attributes can also be listed on this table such as medium type, availability status, and so on. Line 493 represents a record of a storage volume which has "Vol03" as the ID, indicating that it is the external storage volume provided by storage array "EAry10", and that their attributes such as size and RAID type are null.

This table is referred to by the Storage Virtualizer Management Module 200 to determine the attribute values of internal storage volumes or the relationship between respective the virtual storage volumes and the storage arrays that actually provides external capacity to the storage volume.

FIG. 5 illustrates an example data structure of the Storage Volume Table 500 placed on each of the storage arrays. It contains the ID and the attribute values of the respective storage volumes that the storage array manages.

Storage Volume ID 510 is the identification for a given storage volume.

Size 520 indicates the size of the storage volume.

RAID Type 530 indicates the RAID type of the Storage Volume.

For instance, line 591 represents a record of a storage volume which has "Vol03" as the ID, a "1 TB" size of capacity with a "RAID1" configuration.

This table is referred by Storage Array Management Module 210 to find attribute values of Storage Volumes.

FIG. 6 shows an example process sequence of the management task distribution between the Storage Management Client Module 220, the Storage Virtualizer Management Module 200 and the Storage Array Management Module 210.

Step 601: The management client generates a management task request message, for example enumerating all of the storage volumes within entire system, and send the request to the storage virtualizer.

Step 602: The storage virtualizer forwards the task request to the storage arrays to process the task concurrently, but before that, it will respond to the management client that a notifying asynchronous task has started and a specific indication count with at least part of the task result will be sent to the management client.

Step 603: The storage virtualizer subscribes Indication Listener information to each Storage Array where the task will be delegated. The Indication Listener is the entity that will receive the indication from the storage array, so in this invention, the management client is the Indication Listener and the storage virtualizer will subscribe to access information of the management client.

Step 604: The storage virtualizer forwards the received management task from the management client to the storage array. For instance, if the request was enumerating the storage volume information, the storage array will display storage volume information only for those storage volumes that the storage array holds. The storage virtualizer will repeat step 603 and 604 for every one of the storage arrays. These steps are actually the "distribution" aspect of the management task from the management client.

Step 605: The respective storage arrays perform the requested management task (independently) for its own storage volumes. After developing a response message, it will send the message to the registered listener (which is the management client) as an indication as to what holds the task result, for example a list of storage volume information that is held by the storage array.

Step 606: After the management client receives the indication, it will extract the result portion of the entire system from the message XML and count the number of indications received. Then it will send an acknowledgement of the indication to the storage array.

Step 605 and 606 will be performed for every storage array that was requested to do its part of the task. The management client will continue collecting the resulting parts from indications that those storage arrays send. The distribution in steps 603 and 604 and the aggregation in steps 605 and 606 are key behaviors of this invention for relieving the workload of the storage virtualizer.

Step 607: The storage virtualizer send an indication to the management client which holds the result in regards to the internal storage volume.

Step 608: After the management client receives all of the expected indications and concatenates the results as a single result, then it will send an acknowledgement to the storage virtualizer. This indicates that all indications have been received.

Step 609: The storage virtualizer deletes registered indication listeners from storage arrays that were subscribed to in step 603.

FIG. 7 illustrates an example of a message format sent back to Management Client from Storage Arrays or Storage Virtualizer. It will be sent during steps 605 or 607 as described above. This example shows a part of the response message for the request of enumerating storage volume information.

700: Response message tag.

701: A response message of the "EnumerateInstances" task.

702: An information block corresponding to a Storage Volume.

703: The class name of the information ("StorageVolume" in this case)

704: The Key property of the Storage Volume "ID" ("Vol03" in this case)

705: Value of property "Size" is "2147483648", showing the number of blocks.

706: Value of property "RAIDType" is "RAID1"

FIG. 8 shows an example of the message format sent to the storage arrays from the storage virtualizer in step 604 as shown above. The storage virtualizer distributes a received management task request by sending this type of message to the respective storage arrays with a specifying "IndicationOption". In the normal request, the receiver of the request will send the result straight back to the requester. However, if the IndicationOption is specified, the receiver won't send the result to the requester by normal response, but will instead send the result as an indication to the listener subscribed in advance. Therefore in this invention, every storage array sends their results directly to the management client instead of sending it back to the storage virtualizer so that it won't increase the workload of the storage virtualizer.

800 is the request message tag.

801 is a request message of the "EnumerateInstances" task.

802 is the namespace to be used.

803 is the class name of the information ("StorageVolume" in this case)

804: The IndicationOption is "TRUE", indicating that the response to this request needs to be sent by an indication instead of simply returning it to the requester by a normal response message.

FIGS. 9 through 12 shows an example process for a management task distribution executed on the storage virtualizer after it has requested the task from the management client.

Steps 1000 to 1070 count how many indications will be sent to the management client after performing the task concurrently with the storage arrays, and then forwards the number to the management client.

Step 1000: Initializes the variable v_NumberOfIndications.

Step 1010: Selects records from the unified storage volume table wherein volume type is "Internal" in order to determine whether any internal storage volumes exist. If there are no internal volumes, then proceed to step 1030 otherwise proceed to step 1020.

Step 1020: Increments the v_NumberOfIndications.

Step 1030: Selects a record from the external array table. If every record is processed then proceed to step 1070 otherwise proceed to step 1040.

Step 1040: Selects records from the unified storage volume table wherein the Storage System ID is identical to the record obtained in step 1030. This means selecting a set of records in regards to the picked storage array in step 1030. If there is no record found then proceed back to step 1030 otherwise proceed to step 1050.

Step 1050: Adds selected records in step 1030 to the array type of variable v_ExternalArray[].

Step 1060: Increments the v_NumberOfIndications and proceeds back to step 1030 to process the next storage array.

Step 1070: Sends a response message to the management client that the requested management task has been asynchronously distributed and v_NumberOfIndications of indications will be sent.

Steps 1100 to 1130 demonstrate how the storage virtualizer subscribes to the indication listener information (where the receiver of the result is the management client) and forwards the management task to each of the storage arrays. The subscription may be done with several steps such as registering the listener information, specifying filter information that which action to be indicated and so on. If it can be determined that the indication listener will only be the management client in all of the task cases, then their steps can also be done when the first request is received and thus skipped after the second requests.

Step 1100: Select a record from the v_ExternalArray generated in step 1050. If every record is processed then proceed to step 1200 otherwise proceed to step 1110.

Step 1110: Gets the IP address and the namespace of the target storage array from the record selected in step 1100.

Step 1120: Subscribes the indication listener information to the target storage array with the IP address of the management client.

Step 1130: Forwards the requested message which the storage virtualizer received from the management client to the target storage array with the specified IndicationOption and proceeds back to step 1100 for the next storage array.

Steps 1200 to 1230 illustrate how the storage virtualizer performs the requested management task regarding the internal storage volumes and sends the result to the management client as an indication.

Step 1200: Selects a record from the unified storage volume table wherein the volume type is "Internal". If every record has been processed then proceed to step 1230 otherwise proceed to step 1210.

Step 1210: Generates an XML entity (shown in 702 of FIG. 7) for the storage volume attributes.

Step 1220: Appends the generated entity to the indication message (to be sent), and proceeds back to step 1200 for the next internal storage volume.

Step 1230: Sends the generated indication message to the management client. (But it may be skipped if there is no internal storage volume exit.)

Steps 1300 to 1330 demonstrate how the storage virtualizer deletes registered indication listener information from the storage arrays after it receives the "all results were received" notice from the management client. Even if the storage virtualizer sends its result to the management client earlier it will wait until it collects all of the indications and then sends an acknowledgement to the Storage Virtualizer.

Step 1300: (After sending the indication from the storage virtualizer to the management client) Waits and then receives acknowledgement of all indication receipts from the management client.

Step 1310: Selects a record from v_ExternalArray generated in step 1050. If every record is processed then ends the process otherwise proceed to step 1320.

Step 1320: Gets the IP address and the namespace of the target storage array from the record selected in step 1310.

Step 1330: Deletes the indication listener information from the target storage array (which has IP address of the management client) and proceeds back to step 1310 for the next storage array.

FIG. 13 shows an example process for the management task execution on each storage array after delegation from the storage virtualizer.

Steps 1400 to 1450 demonstrate the process for generating the indication message that contains the task result regarding the storage volumes that the storage array holds.

Step 1400: Selects all of the records from the storage volume table.

Step 1410: Selects a record obtained in step 1400. If every record is processed then proceed to step 1440 otherwise proceed to step 1420.

Step 1420: Generates an XML entity for the storage volume attributes.

Step 1430: Appends the generated entity to the indication message (to be sent), and proceeds back to step 1410 for the next storage volume.

Step 1440: Sends generated indication message to the Management Client.

Step 1450: Waits and receive an acknowledgement of the indication from the management client and ends the process.

FIG. 14 shows an example process for issuing management task request to the Storage Virtualizer from the Management Client and receiving every result from Storage Arrays.

Step 1500: Sends a request to the storage virtualizer to enumerate information regarding all of the storage volumes, including both the internal and virtual volumes that it manages.

Step 1510: Waits for and receives a response from the storage virtualizer with the number of expected indications (the results of the requested task).

Step 1520: Initializes the variable v_NumberOfIndications.

Step 1530: If all of the expected indications are received then proceed to step 1590 otherwise proceed to step 1540.

Step 1540: Waits for and receives an indication either from the storage virtualizer or the storage arrays.

Step 1550: Increments v_NumberOfIndications.

Step 1560: Concatenates the received storage volume information.

Step 1570: If the received indication was from the storage virtualizer then proceed back to step 1530 otherwise proceed to step 1580.

Step 1580: Sends an indication acknowledgement to the storage array.

Step 1590: (After receiving all expected indications) Sends an indication acknowledgement to the storage virtualizer.

As shown above, every management task requested to the storage virtualizer was distributed to each of the storage arrays. However, if the total number of (virtual plus internal) storage volumes is sufficiently small enough, then the distribution process might create more overhead time compared to doing the task through the storage virtualizer. Therefore in this second embodiment, the storage virtualizer will determine whether the task should be distributed to the storage arrays or done by itself based on the number of storage volumes. In order to make this decision, the unified storage volume table needs to hold the attribute values of virtual storage volumes as well as internal storage volumes.

Second Embodiment

FIG. 15 shows an example data structure of the Unified Storage Volume Table 2000 for the second embodiment. Though similar to the table in the first embodiment, in this embodiment, the table now holds attribute values for the virtual storage volumes as well as the internal storage volumes.

Size 440: Size of the storage volume. In the first embodiment, the value for the virtual storage volume was null, but the actual value is now copied from the external storage array in the second embodiment.

RAID Type 450: RAID type of the storage volume. Same as above.

For instance, line 2093 represents a record of a storage volume which has "Vol03" as the ID, is an "External" storage volume provided by the storage array "EAry10", and has a "1 TB" capacity size with a "RAID1" configuration.

FIG. 16 shows an example process for the management task distribution executed on the storage virtualizer after it has requested the task from the management client for the second embodiment. This process will be inserted before the beginning of steps shown in first embodiment.

Steps 2100 to 2150 checks for the total number of internal and virtual storage volumes. If it is smaller than a given threshold, then it won't distribute the task and instead executes through the storage virtualizer itself as normal request and response mechanism. If the count exceeds the threshold then it will start the task distribution.

Step 2100: Selects all the records from the Unified Storage Volume Table.

Step 2110: If the number of records obtained in step 2100 is greater than the threshold then proceed to step 1000 as shown in first embodiment to start the task distribution otherwise proceed to step 2120.

Step 2120: Selects a record obtained in step 2100. If every record is processed then proceed to step 2150 otherwise proceed to step 2130.

Step 2130: Generates an XML entity for the storage volume attributes.

Step 2140: Appends the generated entity to the response message.

Step 2150: Sends a general response message to the management client as normal response.

In this second embodiment, there is one process step of the management task request on the management client that is different from the first embodiment. In step 1510, if the management client receives the general response, including the task result which was done by the storage virtualizer, then the process ends, but if the response indicates that asynchronous distribution has started (as described in the first embodiment) then proceed to step 1520.

Third Embodiment

In the second embodiment, the total number of both internal and virtual storage volumes determined the task distribution. For the third embodiment, the determination method can additionally be that if the number of virtual storage volumes for a specific storage array is larger than a given threshold, then the task is delegated to the storage array. It is thereby advantageous to separate the workload from the storage virtualizer when it has a certain number of volumes.

FIG. 17 shows an example process for the management task distribution executed on the storage virtualizer in the third embodiment. It shows only a portion to determine whether the task is delegated to a specific storage array or not.

Step 3000: After the records related to a specific storage array is selected in step 1040, it checks the number of records (storage volumes that the storage array holds) and if it is smaller than the threshold then the process is executed by the storage virtualizer rather than by the storage array. Otherwise, if the number is enough to delegate, then it proceeds to step 1050 as described in the first embodiment.

Step 3010: Add selected records in step 1040 to the array type of the variable v_StorageVolume[]. It will become the list of storage volumes that will be handled by the storage virtualizer instead of by the storage arrays.

FIG. 18 shows another portion of the example process for the management task distribution executed on the storage virtualizer for the third embodiment. In this embodiment, both the internal storage volumes and the virtual storage volumes (of which few are held by the storage arrays) will be handled by the storage virtualizer.

Step 3100: Selects all of the records from the unified storage volume table where the volume type is "Internal".

Step 3110: Appends the selected records in step 3100 to v_StorageVolume[], which was filled with the virtual storage volumes in step 3010.

Step 3120: Selects a record from v_StorageVolume[] (may be either an internal storage volume or a virtual storage volume). If every record has been processed then it proceeds to step 1230, otherwise it proceeds to step 1210.

Exemplary Computer Platform

FIG. 19 is a block diagram that illustrates an embodiment of a computer/server system 1900 upon which an embodiment of the inventive methodology may be implemented. The system 1900 includes a computer/server platform 1901, peripheral devices 1902 and network resources 1903.

The computer platform 1901 may include a data bus 1904 or other communication mechanism for communicating information across and among various parts of the computer platform 1901, and a processor 1905 coupled with bus 1901 for processing information and performing other computational and control tasks. Computer platform 1901 also includes a volatile storage 1906, such as a random access memory (RAM) or other dynamic storage device, coupled to bus 1904 for storing various information as well as instructions to be executed by processor 1905. The volatile storage 1906 also may be used for storing temporary variables or other intermediate information during execution of instructions by processor 1905. Computer platform 1901 may further include a read only memory (ROM or EPROM) 1907 or other static storage device coupled to bus 1904 for storing static information and instructions for processor 1905, such as basic input-output system (BIOS), as well as various system configuration parameters. A persistent storage device 1908, such as a magnetic disk, optical disk, or solid-state flash memory device is provided and coupled to bus 1901 for storing information and instructions.

Computer platform 1901 may be coupled via bus 1904 to a display 1909, such as a cathode ray tube (CRT), plasma display, or a liquid crystal display (LCD), for displaying information to a system administrator or user of the computer platform 1901. An input device 1910, including alphanumeric and other keys, is coupled to bus 1901 for communicating information and command selections to processor 1905. Another type of user input device is cursor control device 1911, such as a mouse, a trackball, or cursor direction keys for communicating direction information and command selections to processor 1904 and for controlling cursor movement on display 1909. This input device typically has two degrees of freedom in two axes, a first axis (e.g., x) and a second axis (e.g., y), that allows the device to specify positions in a plane.

An external storage device 1912 may be coupled to the computer platform 1901 via bus 1904 to provide an extra or removable storage capacity for the computer platform 1901. In an embodiment of the computer system 1900, the external removable storage device 1912 may be used to facilitate exchange of data with other computer systems.

The invention is related to the use of computer system 1900 for implementing the techniques described herein. In an embodiment, the inventive system may reside on a machine such as computer platform 1901. According to one embodiment of the invention, the techniques described herein are performed by computer system 1900 in response to processor 1905 executing one or more sequences of one or more instructions contained in the volatile memory 1906. Such instructions may be read into volatile memory 1906 from another computer-readable medium, such as persistent storage device 1908. Execution of the sequences of instructions contained in the volatile memory 1906 causes processor 1905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1905 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 1908. Volatile media includes dynamic memory, such as volatile storage 1906.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 1905 for execution. For example, the instructions may initially be carried on a magnetic disk from a remote computer. Alternatively, a remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on the data bus 1904. The bus 1904 carries the data to the volatile storage 1906, from which processor 1905 retrieves and executes the instructions. The instructions received by the volatile memory 1906 may optionally be stored on persistent storage device 1908 either before or after execution by processor 1905. The instructions may also be downloaded into the computer platform 1901 via Internet using a variety of network data communication protocols well known in the art.

The computer platform 1901 also includes a communication interface, such as network interface card 1913 coupled to the data bus 1904. Communication interface 1913 provides a two-way data communication coupling to a network link 1914 that is coupled to a local network 1915. For example, communication interface 1913 may be an integrated services digital network (ISDN) card or a modem to provide a data communication connection to a corresponding type of telephone line. As another example, communication interface 1913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1913 sends and receives electrical, electromagnetic or optical signals that carry digital data streams representing various types of information.

Network link 1913 typically provides data communication through one or more networks to other network resources. For example, network link 1914 may provide a connection through local network 1915 to a host computer 1916, or a network storage/server 1917. Additionally or alternatively, the network link 1913 may connect through gateway/firewall 1917 to the wide-area or global network 1918, such as an Internet. Thus, the computer platform 1901 can access network resources located anywhere on the Internet 1918, such as a remote network storage/server 1919. On the other hand, the computer platform 1901 may also be accessed by clients located anywhere on the local area network 1915 and/or the Internet 1918. The network clients 1920 and 1921 may themselves be implemented based on the computer platform similar to the platform 1901.

Local network 1915 and the Internet 1918 both use electrical, electromagnetic or optical signals that carry digital data streams. The signals through the various networks and the signals on network link 1914 and through communication interface 1913, which carry the digital data to and from computer platform 1901, are exemplary forms of carrier waves transporting the information.

Computer platform 1901 can send messages and receive data, including program code, through the variety of network(s) including Internet 1918 and LAN 1915, network link 1914 and communication interface 1913. In the Internet example, when the system 1901 acts as a network server, it might transmit a requested code or data for an application program running on client(s) 1920 and/or 1921 through Internet 1918, gateway/firewall 1917, local area network 1915 and communication interface 1913. Similarly, it may receive code from other network resources.

The received code may be executed by processor 1905 as it is received, and/or stored in persistent or volatile storage devices 1908 and 1906, respectively, or other non-volatile storage for later execution. In this manner, computer system 1901 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized tiered storage systems for handling management tasks efficiently without creating a bottleneck within the storage environment. Therefore, the invention can also be applied to any objects or components managed within the virtualizer or the arrays. It is intended that the specification and examples be considered as exemplary only, with a true scope and spirit of the invention being indicated by the following claims.

What is claimed is:

1. A computerized storage system comprising:
   a plurality of storage arrays, each storage array comprising a controller;
   a storage virtualizer, to which the plurality of storage arrays are externally attached so that a plurality of storage volumes in the plurality of storage arrays are virtually represented to a host as if the plurality of volumes exist on the storage virtualizer, the storage virtualizer, comprising a storage virtualizer management module;
   a management client sending a management command to the storage virtualizer;
   wherein the storage virtualizer management module comprises instructions for:
   receiving a command from the management client;
   selecting a storage array from the plurality of storage arrays; and delegating the received management command to the selected storage array for processing;

wherein the selected storage array sends a result of the delegated received command directly to the management client;

wherein the storage virtualizer management module further comprises instructions that execute a process for sending a notice to the management client that the command sent from the management client has been asynchronously started; and wherein the notice indicates the command has been distributed and performed; and wherein the notice indicates that a plurality of results will be sent back.

2. The computerized storage system of claim 1, wherein the storage virtualizer management module further comprises instructions that execute a process for determining if a command sent from the management client should be delegated or executed by the storage virtualizer.

3. The computerized storage system of claim 2, wherein if the storage virtualizer determines that the command sent from the management client should be delegated, the storage virtualizer sends a request to the plurality of storage arrays that a result of the command be sent directly to the management client instead of the storage virtualizer.

4. The computerized storage system of claim 2, wherein if the storage virtualizer determines that the command sent from the management client should be delegated, the storage virtualizer subscribes indication listener information to each of the plurality of storage arrays and forwards the command to the each of the plurality of storage arrays, and wherein the each of the plurality of storage arrays sends the result of the command to indication listener specified in the indication listener information.

5. The computerized storage system of claim 4, wherein if it is determined that the command sent from the management client is delegated, and when all the results of the command performed in the each of the plurality of storage arrays are sent to the indication listener, the indication listener sends acknowledgement to the storage virtualizer, and wherein the storage virtualizer unsubscribes the indication listener information from the storage arrays.

6. The computerized storage system of claim 2, wherein the storage virtualizer responds to the management client either with the notice or the result of the received command based on the determination.

7. The computerized storage system of claim 2, wherein the storage virtualizer further comprises a unified storage volume table holding attributes for the storage volumes in the plurality of storage arrays and for storage volumes in the storage virtualizer.

8. The computerized storage system of claim 7, wherein the unified storage table comprises ID information of the storage volumes in the plurality of storage arrays and of the storage volumes in the storage virtualizer.

9. The computerized storage system of claim 8, wherein the unified storage table further comprises size of the storage volumes in the plurality of storage arrays.

10. The computerized storage system of claim 2, wherein the determination is based on a comparison between a threshold and a total number of available storage volumes in the storage virtualizer and the plurality of storage arrays; and wherein if the total number of available storage volumes exceeds the threshold, then the storage virtualizer management module delegates the command sent from the management client to all storage arrays and wherein if the total number of available storage volumes is smaller than the threshold, then the storage virtualizer executes the command sent from the management client for the storage volumes.

11. The computerized storage system of claim 2, wherein the determination is based on a comparison between a threshold and a total number of available storage volumes in a storage array of the plurality of storage arrays, and wherein if the total number of available storage volumes in the storage array of the plurality of storage arrays exceeds the threshold, then the storage virtualizer management module delegates the command sent from the management client to the storage array, and if the total number of available storage volumes in the storage array of the plurality of storage arrays is smaller than the threshold, then the storage virtualizer executes the command sent from the management client for the storage volumes in the storage array.

12. The computerized storage system of claim 1 further comprising an external array table comprising access information of the storage arrays, wherein the selecting a storage array is done by selecting a storage array from the external array table.

13. The computerized storage system of claim 8, wherein each of the plurality of storage arrays further comprises a storage volume table that holds identification and attribute values of the storage volumes in the respective storage array.

14. The computerized system of claim 2, wherein the storage virtualizer further comprises a controller, a CPU, and a program module handling execution of management commands.

15. The computerized system of claim 2, wherein each of the plurality of the storage arrays further comprises a controller, a CPU, and a program module handling execution of commands.

16. The computerized system of claim 11, wherein the selected storage array utilizes the controller, the CPU, and the program module to execute the management command delegated from the storage virtualizer so as to distribute management workload related to the storage volumes in the storage array.

17. The computerized system of claim 1, wherein the storage management client module of the management client handles receiving the plurality of results from either the plurality of storage arrays or from the storage virtualizer.

18. The computerized storage system of claim 17, wherein the result is concatenated such that the management client can keep a full list of management command results.

* * * * *